United States Patent
Zens et al.

(10) Patent No.: US 11,884,129 B2
(45) Date of Patent: Jan. 30, 2024

(54) DEVICE FOR REGULATING A THROUGHFLOW AND DISTRIBUTING A FLUID IN A FLUID CIRCUIT

(71) Applicant: Hanon Systems, Daejeon (KR)

(72) Inventors: Daniel Zens, Kreuzau (DE); Nils Michael Schlattmann, Cologne (DE); Dominik Wiechard, Cologne (DE); Björn Bergmann, Sankt Augustin (DE); Deny Laforge, Kerpen (DE); Jerome Görres, Cologne (DE); Johannes Müller, Neuss (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/756,735

(22) PCT Filed: Jan. 14, 2021

(86) PCT No.: PCT/KR2021/000557
§ 371 (c)(1),
(2) Date: Jun. 1, 2022

(87) PCT Pub. No.: WO2021/145705
PCT Pub. Date: Jul. 22, 2021

(65) Prior Publication Data
US 2023/0010998 A1    Jan. 12, 2023

(30) Foreign Application Priority Data

Jan. 17, 2020   (DE) .................... 10 2020 101 031.1

(51) Int. Cl.
*F16K 11/07*    (2006.01)
*B60H 1/00*     (2006.01)
(Continued)

(52) U.S. Cl.
CPC .......... *B60H 1/00485* (2013.01); *F16K 11/07* (2013.01); *F16K 31/04* (2013.01); *F25B 41/35* (2021.01)

(58) Field of Classification Search
CPC ....................................................... F16K 11/07
(Continued)

(56) References Cited

U.S. PATENT DOCUMENTS 3,756,280 A * 9/1973 Parquet ................. F16K 11/065
137/625.25
5,171,025 A   12/1992 Stoll et al.
2017/0002937 A1* 1/2017 Yoshida ................ F16K 31/122

FOREIGN PATENT DOCUMENTS

DE   102013206626 A1   10/2014
DE   102016013492 A1   5/2018
(Continued)

*Primary Examiner* — Paul J Gray
(74) *Attorney, Agent, or Firm* — Shumaker, Loop & Kendrick, LLP; James D. Miller

(57) ABSTRACT

A device for regulating a throughflow and distributing a fluid in a fluid circuit, in particular a refrigerant. The device has a housing with ports for connecting to fluid lines which are connected to at least one inner volume of the housing designed as a valve chamber via a respective through opening, and at least one valve element arranged in the valve chamber with a drive element for moving the valve element relative to the housing. The at least one valve element is mounted such that it can be displaced in a linear manner in the axial direction along a longitudinal axis such that a passage for the fluid is opened between a first port designed as an inlet and a second port designed as a first outlet and/or a third port designed as a second outlet.

18 Claims, 2 Drawing Sheets

(51) Int. Cl.
   *F25B 41/35* (2021.01)
   *F16K 31/04* (2006.01)
(58) Field of Classification Search
   USPC .......................................... 137/118.02, 883
   See application file for complete search history.

(56) References Cited

FOREIGN PATENT DOCUMENTS

| | | | |
|---|---|---|---|
| JP | H11287354 | A | 10/1999 |
| JP | 2000193127 | A | 7/2000 |
| JP | 3569624 | B2 | 9/2004 |
| JP | 2014062559 | A | 4/2014 |

* cited by examiner

DEVICE FOR REGULATING A THROUGHFLOW AND DISTRIBUTING A FLUID IN A FLUID CIRCUIT

CROSS REFERENCE TO RELATED APPLICATIONS

This is a U.S. national phase patent application of PCT/KR2021/000557 filed Jan. 14, 2021 which claims the benefit of and priority to German Pat. Appl. No. 10 2020 101 031.1 filed on Jan. 17, 2020, the entire contents of each of which are incorporated herein by reference.

TECHNICAL FIELD

The invention relates to a device for regulating a throughflow and distributing a fluid in a fluid circuit, in particular a refrigerant in a refrigerant circuit. The device has a housing with ports for connecting to fluid lines which are connected to at least one inner volume of the housing designed as a valve chamber via a respective through opening, and at least one valve element arranged in the valve chamber with a drive element for moving the valve element relative to the housing.

BACKGROUND ART

With motor vehicles known in the state of the art, a high requirement for the comfort of the passengers in the vehicle interior by air conditioning systems with different circuits for refrigerants and coolants is met with respective differently operated heat exchangers. Traditional motor vehicles with an electric motor drive, shortly referred to as electric vehicles, or motor vehicles with a hybrid drive of an electric motor and an internal combustion engine, shortly referred to as hybrid vehicles, also in most cases have a higher supply need of cooling or heating than motor vehicles with a pure combustion engine drive due to their design with additional components of the electric drive train such as a high voltage battery, an internal charger, a transformer, an inverter and the electric motor. Apart from the refrigerant circuit of the actual air conditioning system, known motor vehicles are designed with a purely electric drive or an electric hybrid drive with a coolant circuit in which the circulating coolant for discharging the warmth emitted by the drive components is guided through a coolant-refrigerant heat exchanger in order to transfer the heat from the coolant to the refrigerant circulating in the refrigerant circuit.

Thermal systems of electrically driven motor vehicles have a major influence on the range of the motor vehicles due to the required need for energy. This means that a demand based distribution of flows of heat in the motor vehicle with different subsystems enables, for example, a faster conditioning of components which require an optimum operating temperature. In motor vehicles operated by electric batteries and motor vehicles with a hybrid drive, for which, apart from the conditioning of the vehicle interior, the conditioning of the high voltage components of the electric drive train, for example, is of special interest as well, the influence of the operation of the thermal systems is to be minimized to the range of the motor vehicles.

It is also known from the state of the art to design refrigerant circuits of air conditioning systems in a heat pump mode as well as in a cooling system mode in order to distribute thermal energies within the motor vehicle. Heat, for example, in particular during operation of the refrigerant circuit in the heat pump mode, can be received from the environmental air or a coolant circuit which then can be transferred to components of the motor vehicle with a requirement for heat or to the incoming air to the vehicle interior. During operation of the refrigerant circuit in the cooling system mode, heat can be received from the vehicle interior or from the incoming air to the vehicle interior or other components and for example be transferred to the environment. In doing so, the heat carrier circuits, such as refrigerant circuits and coolant circuits, within the thermal systems are connected to one another and to further components of the motor vehicle. In particular in the case of hybrid-driven motor vehicles, there are major challenges to arrange the thermal system for the conditioning of different components in the available installation space.

DE 10 2013 206 626 A1 discloses a refrigerant circuit for the air-conditioning of a vehicle. The refrigerant circuit has a compressor as well as several heat exchangers operated as evaporators or as condensers for transferring heat with the refrigerant. In doing so, the refrigerant circuit is designed with at least three evaporators and two condensers, wherein there is an expansion valve arranged upstream of each evaporator in order to relax the refrigerant and a return valve arranged downstream of each condenser in order to avoid refrigerant shifts within the refrigerant circuit. The components of the refrigerant circuit, in particular the large number of valves, are respectively connected to one another via connection lines in the refrigerant circuit.

A plurality of valves and connection lines is required in order to provide the diverse functionalities. In doing so, each valve has an actuator and is to be connected to a drive unit, which causes high system complexity. As a consequence, apart from high costs, this also causes a high weight of the refrigerant circuit. Also, a large installation space is required.

It is not known from the state of the art to design several valves of one fluid circuit, in particular of a refrigerant circuit, internally and thus in a common housing connected to one another.

In particular in the case of a refrigerant circuit with carbon dioxide as a refrigerant, there is also a large amount of force needed in order to switch the valve between 5 the functions in the case of differential pressures of up to 100 bar.

DE 10 2016 013 492 A1 reveals an in particular electrically driven expansion and shutoff valve for the operation with carbon dioxide as a refrigerant with a valve body arranged in a valve body chamber, a seal seat and a seal which are arranged along an axial direction of movement of the valve body inside the valve. In a closed state of the valve, the diameters of the valve body designed as a needle at positions of the seal seat and the seal correspond to the respective seal diameters. Furthermore, a pressure bypass is opened in the closed state of the valve between a medium connection and the valve body chamber.

The valve has two medium connections, wherein a flow cross section of the connection can be opened or closed. In doing so, the flow cross section of the connection can either be fully opened or only be partially opened. The refrigerant flows through the valve in only one flow direction. When operating the valve with a partially opened flow cross section, the refrigerant is relaxed while flowing through the valve.

SUMMARY

The object of the invention is to provide a device for regulating a throughflow and distributing a fluid in a fluid circuit, in particular in refrigerant circuits, of a thermal system of a motor vehicle. In the device, functionalities, in particular of valves, should be combined in order to minimize the costs, the weight and the installation space, apart from the complexity of the system. Furthermore, the device should also be easily operable when using in circuits with carbon dioxide as a circulating fluid, in particular with little effort.

The object is solved by the subject matters with the features shown and described herein.

The object is solved by a device for regulating a through-flow and distributing a fluid in at least one fluid circuit, in particular a refrigerant in a refrigerant circuit. The device has a housing with ports for connecting to fluid lines which are connected to at least one inner volume of the housing designed as a valve chamber via a respective through opening, and at least one valve element arranged in the valve chamber with a drive element for moving the valve element relative to the housing.

According to the concept of the invention, the at least one valve element is mounted such that it can be displaced in a linear manner in the axial direction along a longitudinal axis such that a passage for the fluid is opened between a first port designed as an inlet and a second port designed as a first outlet or between the first port designed as an inlet and a third port designed as a second outlet. The valve element can also be arranged such that a respective passage between the inlet and the first outlet and the second outlet is at least partially opened.

Furthermore, the valve element according to the invention is designed in the form of a cylinder oriented in the axial direction, in particular a circular cylinder, with a first section and a second section which are arranged in the axial direction in a manner spaced apart from one another and are connected to one another via a coupling element. In doing so, the sections represent valve needles of a needle valve which are connected to one another in particular via the coupling element.

According to a preferred embodiment of the invention, the coupling element arranged between the sections has a smaller outer circumference, in particular a smaller outer diameter, than the first section and the second section of the valve element. The sections are preferably designed with same forms and extensions, in particular in the axial direction, which corresponds to one length, and outer circumferences.

According to a further development of the invention, the valve element is arranged such that it can be displaced in the longitudinal direction with the first section within a first valve seat element and with the second section within a second valve seat element.

The first section and the second section of the valve element can preferably be arranged in a sealing manner via a respective sealing element to the housing and to the valve seat element such that the first outlet and the second outlet are open or closed depending on the arrangement of the first section relative to a first sealing element and depending on the arrangement of the second section relative to a second sealing element. The respective outlet is closed when the section of the valve element assigned to the outlet is arranged within the respective sealing element and the sealing element is fully arranged around the section. The respective outlet is opened and thus a passage for the fluid is created for the inlet to the respective outlet of the device when the section of the valve element assigned to the outlet is arranged outside the respective sealing element and an in particular full gap is created between the sealing element and an 5 outer wall of the section.

A further advantage of the invention is that the sections of the valve element are respectively designed in the form of a hollow cylinder with an opening oriented in the longitudinal direction, in particular a through opening. In doing so, a wall enclosing the opening has a respective first winding of a winding pair provided as an inner winding.

Furthermore, a respective second winding designed as an outer winding is arranged at least in the region of ends of the coupling element such that the coupling element is screwed into a section of the valve element with a respective end.

According to a preferred embodiment of the invention, the device has at least a first pressure chamber and a second pressure chamber which are respectively designed as a region of the valve chamber at an end face of the valve element oriented in the axial direction. The pressure chambers preferably serve a pressure balance for reducing the 20 movement energy or the force required to move the valve element.

Preferably, at least one of the pressure chambers is fluidly connected to the through opening of the first port of the housing and the pressure chambers are fluidly connected to one another.

According to a first alternative embodiment of the invention, the pressure chambers are fluidly connected to the through opening of the first port of the housing via a respective connection channel. In doing so, the connection channels are preferably designed within the wall of the housing.

According to a second alternative embodiment of the invention, the pressure chambers are fluidly connected to one another via a connection channel which is designed within the valve element. In doing so, regions of the connection channel are respectively provided as an opening within the sections of the valve element and respectively between the sections and the coupling element. The passages of the connection channel extending between the sections and the coupling element of the valve element can respectively be designed as a flattening in the region of the winding pair between a section and the coupling element.

According to a further development of the invention, the through openings of the ports are arranged in a common plane spanned by the x and y directions 5 in which the longitudinal axis of the device is oriented running in the x direction. In doing so, the first port is designed merging from a first side of the longitudinal axis into the valve chamber and the second port and the third port are designed merging from a second side of the longitudinal axis into the valve chamber. The second side of the longitudinal axis is arranged opposite the first side.

The symmetry axes of the through openings of the ports are preferably oriented in parallel to one another. The flow cross sections of the through openings of the ports of the housing preferably have a circular form. The flow cross sections of the through openings are preferably designed with equal diameters which can be constant over the respective length.

According to a further preferred embodiment of the invention, the valve element is designed on end faces of the sections respectively oriented towards the coupling element, with a curved contour such that the fluid can be relaxed depending on the arrangement 20 of the section of the valve element relative to the sealing element when flowing between the curved contour and the sealing element.

Thus, the device advantageously represents a combination of two valves, in particular of two shut-off valves, respectively with an expansion function and thus a combination of two shut-off valves and two expansion valves. In doing so, the fluid, in particular the refrigerant, is guided from the inlet to the first or primary and/or second or secondary outlet and can be expanded to the opened flow path.

According to an advantageous embodiment of the invention, the at least one valve element is connected to a drive element arranged outside the housing via a connection element.

The connection element is preferably designed as a shaft. In doing so, the connection element is in particular arranged such that it is tightly connected to the drive element at a first end and protruding through a side into the housing at a second end designed distally to the first end and tightly connected to the valve element.

The drive element can be designed as a linear motor or as a rotatory motor with a transmission arrangement, in particular a winding. The transmission arrangement servers to transmit a rotation movement of the connection element around its 5 longitudinal axis into a translational stroke movement of the valve element, wherein the translational stroke movement corresponds to a linear movement.

A drive element provided as a rotatory motor is preferably designed as an electric actuator, in particular as a stepping motor or servomotor, which advantageously allows the control of the angular position, for example. The motor can be designed with a sensor for the determination of the position. The rotatory position of the connection element detected by the sensor can continuously be transmitted to regulatory electronics which regulates the movement of the motor according to settable set values, such as of set angular positions of the connection element, in a circuit.

The device according to the invention is designed as a highly integrated component, in particular as a refrigerant valve, for the execution of several functions. In the device, functions of individual valves are combined.

The advantageous embodiment of the invention allows the use of the device for regulating a throughflow and distributing a fluid in a refrigerant circuit of a thermal system, in particular a thermal management system, of a motor vehicle, for example for conditioning an air mass flow to be supplied to a vehicle interior or a component of a drive train. The device then also serves as an adaptive multipath refrigerant valve for the air conditioning of the vehicle.

The refrigerant circuit in which a device is used can be operated with any refrigerant, in particular R1234yf, R1234a, R134a, R744, R404a, R600 or R600a, R290, R152a, R32 and their mixtures.

The device according to the invention, preferably designed as an electrically operated 3-2-way needle valve, specifically as a needle slide valve, with an expansion function for the refrigerant carbon dioxide has, in summary, diverse advantages in particular as a highly variable refrigerant valve with a plurality of possible throughflow paths for the refrigerant:
- combining of different valve functions, in particular of two valves, specifically shutoff valves with an expansion function, in a 3-2-way valve,
- reducing the complexity during the assembly leads to a simple control and a smaller possibility of errors and failures which reduces expected warranty costs,
- easy operability also by reducing the required actuating force in 5 order to move the valve element,
- minimizing the weight, also due to the fact that only one actuator is needed and there are no connection lines,
- minimizing of leakage of refrigerant as there are no connection lines and sealing 10 points, thereby reducing the costs for the final customer in case of service, minimum producing, maintenance and operating costs and minimum required installation space.

BRIEF DESCRIPTION OF DRAWINGS

Further details, features and advantages of embodiments of the invention result from the following description of example embodiments with reference to the associated drawings.

The following respectively shows a device for regulating a throughflow and distributing a fluid in at least one fluid circuit, in particular a valve for refrigerant circuits of a thermal system of a motor vehicle, respectively with a housing with an inlet and two outlets and with a valve element arranged in a valve chamber.

DESCRIPTION OF AN EMBODIMENT

Figure 1A:
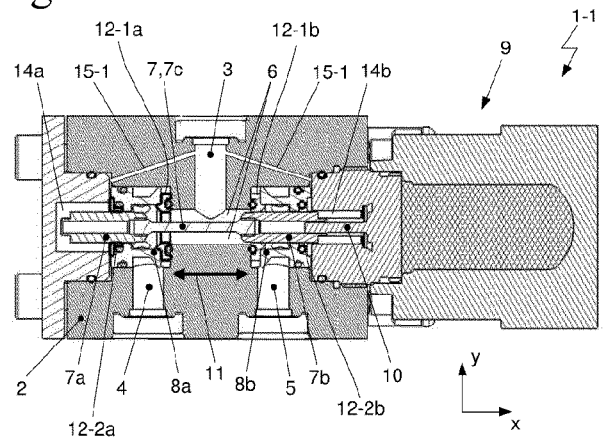
FIGS. 1A and 1B: pressure chambers which are designed such that they are fluidly connected to one another via connection channels and an open passage from the inlet to a first outlet and a flow of the fluid through the inlet into the device, through the device and out of the first outlet of the device in a sectional view.
Figure 1B:
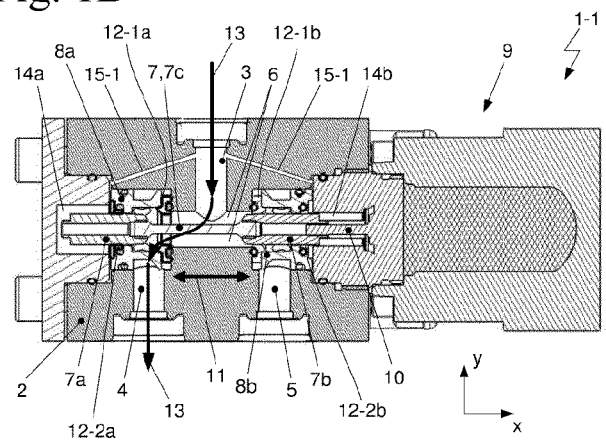
Figure 1C:
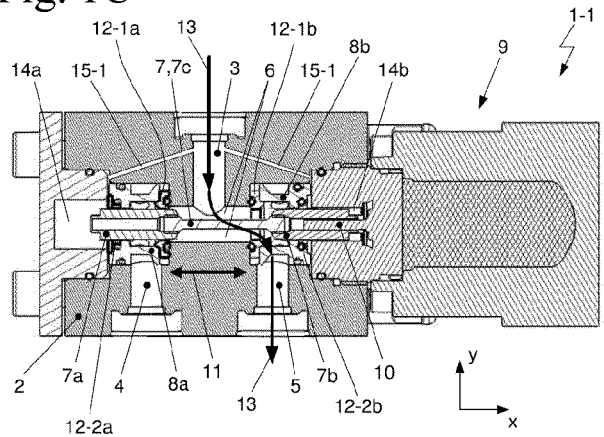
FIG. 1C: pressure chambers which are designed such that they are fluidly connected to one another via connection channels and an open passage from the inlet to a second outlet and a flow of the fluid through the inlet into the device, through the device and out of the second outlet of the device in a sectional view.

FIGS. 1A to 1C respectively show a device 1-1 for regulating a throughflow and distributing a fluid in a fluid circuit, in particular a valve for refrigerant circuits of a thermal system of a motor vehicle in a sectional view. The device 1-1 is designed as an integrated refrigerant valve in order to in particular replace two valves and to reduce the number 5 of two valves to one component.

The device 1-1 has a housing 2 with a first port 3 as an inlet for the refrigerant, a second port 4 as a primary or first outlet for the refrigerant and a third port 5 as a secondary or second outlet for the refrigerant. The ports 3, 4, 5 for refrigerant lines as connection lines to other components of the refrigerant circuit are connected to an inner volume of the housing 2 via respective through openings. The through openings of the ports 3, 4, 5 respectively merge into a valve chamber 6. A valve element 7 is arranged within the valve chamber 6.

The first port 3 is arranged at a first side of the housing 2, while the second port 4 and the third port 5 are provided at a common second side of the housing 2 which is arranged opposite the first side. The symmetry axes of the through openings of the ports 3, 4, 5 are arranged in a common plane spanned by the x and y directions and are oriented in parallel to one another. In doing so, the through opening of the first port 3 is designed in 20 the x direction centrally between the through openings of the second port 4 and the third port 5. The diameters of the flow cross sections of the through openings of the ports 3, 4, 5 of the housing 2 are respectively constant.

The housing 2 is closed apart from the regions of the ports 3, 4, 5. The outer form of the housing 2 is designed such that the functions, for example also a specific arrangement within a system, is guaranteed and that a cost-efficient serial production with a minimum component weight is possible.

The valve element 7 which is substantially designed with three sections has a cylindrical form, in particular with circular cross sections. In doing so, two outer sections 7a, 7b which are arranged in the direction of the symmetry axis and therewith in the longitudinal direction of the valve element 7 in a manner spaced apart from one another are tightly connected to one another via a coupling element 7c. A first section 7a and a second section 7b are also referred to as a first valve needle and a second valve needle. The circular-cylindrical, in particular hollow circular-cylindrical outer sections 7a, 7b are designed with same dimensions, in particular outer diameters and lengths. The coupling element 7c provided in the longitudinal direction of the valve element 7 between the outer sections 7a, 7b, also referred to as valve needle connection, has a smaller outer diameter than the sections 7a, 7b. The sections 7a, 7b and the coupling element 5 7c are oriented on a common symmetry axis or longitudinal axis.

The outer sections 7a, 7b are designed as a hollow cylinder with an opening oriented in the longitudinal direction, in particular a through opening. Within the opening, a respective first winding of a winding pair, specifically an inner winding, can be provided. The respective second winding designed as an outer winding is arranged at least in the region of an end of the coupling element 7c such that the ends of the coupling element 7c are screwed into a respective section 7a, 7b of the valve element 7 designed as a valve needle.

The valve element 7 is arranged in a respective valve seat element 8a, 8b in the region of the first section 7a as well as in the region of the second section 7b such that it is slidable in the longitudinal direction. The valve seat elements 8a, 8b which are arranged in a sealed manner via sealing elements to the housing 2 and to the valve element 7 enable a linear movement of the valve element 7 in the direction of the longitudinal axis.

The valve element 7 is connected to a drive element 9, also referred to as an actuator or an actuating element, arranged outside the housing 2 via a connection element 10. The longitudinal axes of the valve element 7 and of the connection element 10 are oriented in the x direction and in a coaxial manner to one another. The connection element which is, 25 for example, designed as a shaft or as a servo shaft is tightly connected to the drive element 9 at a first end. The connection element 10 is arranged in a sealed manner to the housing 2 with the second end designed distally to the first end and protruding into the housing 2 through the wall of the housing 2 and an end face. The drive element 9 is, for example, designed as a servomotor for driving the connection element 10. The 30 servomotor, as an electric drive, can have a stator with a coil packet and a capsuled rotor with at least one permanent magnet. Consequently, the drive element 9 can be designed as a capsuled motor or as a directly driven motor or as a rotatory motor or as a linear motor.

When designing the drive element 9 as a rotatory motor, the drive shaft provided as a connection element 10 is set into a rotatory movement around the longitudinal axis. With the help of a transmission arrangement which is designed on the connection element oriented in the axial direction, in particular a winding, specifically a so-called movement winding, the rotatory movement of the connection element 10 is 5 translated into a translational stroke movement of the valve element 7 in the x direction. The translational stroke movement therewith corresponds to a linear movement of the valve element 7 in the axial movement direction 11, that is in the direction of the longitudinal axis of the connection element 10 or of the valve element 7 which runs in the direction of the 10 longitudinal axis of the device 1-1 through the end faces of the housing 2 and the valve element 7.

The winding pair of the transmission arrangement is provided between the connection element 10 and the valve element 7. In doing so, a free end of the connection element 10, which substantially has the form of a cylinder rod, in particular a round rod, is inserted into an opening designed in the valve element 7. The free end of the connection element 10 is arranged distally to an end connected to the drive element 9. The connection element 10 therewith has an outer winding as a first element of the winding pair on its free end, while an inner winding is designed as a second element of the winding pair within the opening of the valve element 7.

The valve element 7 which is linearly moved in the axial movement direction 11, is held by the outer form of the cylinder-shaped valve element 7 which substantially extends in the axial direction, preventing a rotatory movement around the axial direction or the longitudinal axis of the valve element 7. The linear movement in the axial direction is permitted. The valve element 7 is moved by the rotatory movement of the drive element 9 without its own rotation around the longitudinal axis in the linear movement in the movement direction 11.

Alternatively, the transmission arrangement which is in particular designed as a winding could also be provided within the motor such that the connection element 10 is displaced in combination with the valve element 7 in the translational stroke movement.

Through the linear movement of the valve element 7, the first port 3 as an inlet for the refrigerant is fluidly connected either with the second port 4 as a first outlet for the refrigerant or the third port 5 as a second outlet for the refrigerant. Alternatively, the device is designed such that, in the case of a specific arrangement of the valve element 7, the first port 3 is fluidly connected to the second port 4 as well as to the third port 5.

The valve element 7 is arranged in a sealing manner in the region of the first section 7a and in the region of the second section 7b via two respective sealing 5 elements 12-1a, 12-1b, 12-2a, 12-2b, in particular a first, static sealing element 12-1a, 12-1b to the housing 2 and to the valve seat element 8a, 8b and a second, dynamic sealing element 12-2a, 12-2b to the housing 2. The first sealing element 12-1a, 12-1b is respectively designed as a seat seal, in particular as a valve seat seal, while the second sealing element 12-2a, 12-2b is respectively designed as a sliding seal, in particular a rod seal, in the form of an axial seal or a ring seal. Consequently, the first sealing element 12-1a, 12-1b is respectively arranged between the housing 2, the valve element 7 and the valve seat element 8a, 8b.

In the opened state of the second port 4 as the first outlet 4 and concurrently closed third port 5 as the second outlet 5 of the device 1-1, according to FIGS. 1A and 1B, the valve element 7 lies against a sealing region of the associated first sealing element 12-1b in the region of the second section 7b, while a fully circumferential gap is designed between the first section 7a of the valve element 7 and the associated first sealing element 12-1a.

In FIG. 1B, the opened passage is shown from the inlet 3 to the first outlet 4 with a flow of the fluid in the flow direction 13 through the inlet 3 into the device 1-1, through the device 1-1 and out of the first outlet 4 of the device 1-1.

Following a displacement of the valve element 7 in the movement direction 11 and in the opened state of the third port 5 or of the second outlet 5 and concurrently closed second port 4 or first outlet 4 of the device 1-1, according to FIG. 1C, the valve element 7 lies against the associated first sealing element 12-1a in the region of the first section 7a in a sealing region, while a fully circumferential gap is designed between the second section 7b of the valve element 7 and the associated first sealing element 12-1b. In FIG. 1C, the opened passage from the inlet 3 to the second outlet 5 is represented with a flor of the fluid in the flow direction 13 through the inlet 3 into the device 1-1, through the device 1-1 and out of the second outlet 5 of the device 1-1.

A first pressure chamber 14a is provided between respective oppositely arranged first end faces of the valve element 7 and the housing 2 forming the inner volume as a valve chamber 6 and a second pressure chamber 14b is provided between second end faces of the housing 2 forming the inner volume as a valve chamber 6 and the valve element 7 arranged towards one another, respectively provided as a free volume whose size can be changed in order to accept refrigerant. The pressure chambers 14a, 14b are also delimited by respective side faces of the valve chamber 6.

The sum of the volumes of the pressure chambers 14a, 14b is constant. The volumes of the pressure chambers 14a, 14b are changed by the linear movement of the valve element 7 in the movement direction 11. The pressure chambers 14a, 14b are fluidly connected to the through opening of the first port 3 of the housing 2 and therewith also to one another via a respective connection channel 15-1 such that the refrigerant applied to the pressure chambers 14a, 14b, at the pressure level, at the inlet 3, depending on the movement direction 11 of the valve element 7 between the pressure chambers 14a, 14b overflows or flows into the pressure chambers 14a, 14b through the through opening of the first port 3 and the connection channels 15-1 or flows out of the pressure chambers 14a, 14b. In doing so, the connection channels 15-1 are designed within the wall of the housing 2. When designing the pressure chambers 14a, 14b, the pressure force or pull force to be applied to the valve element 7 for moving the valve element 7 by the drive element 9 via the connection element 10 is reduced, in particular in the case of a device 1-1 with large diameters of the flow cross sections and a fully opened outlet 4, 5 and thus a maximum throughflow diameter.

Figure 2:
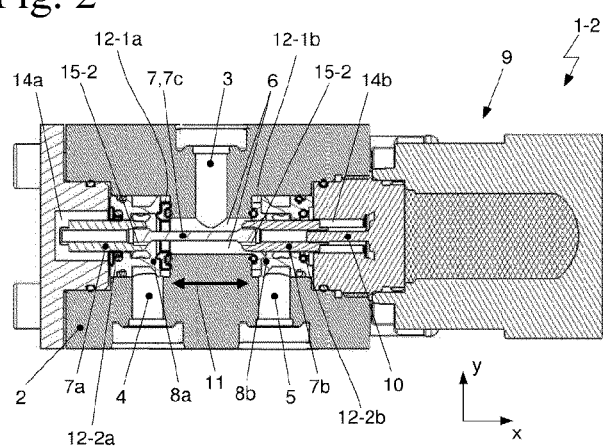
FIG. 2: pressure chambers which are designed such that they are fluidly connected to one another via connection channels and the valve chamber and an open passage from the inlet to the first outlet in a sectional view.

FIG. 2 reveals a further device 1-2 for regulating the throughflow and distributing a fluid in at least one fluid circuit, in particular a valve for refrigerant circuits of a thermal system of a motor vehicle, with a housing 2 with an inlet 3 and two outlets 4, 5 and with a valve element 7 arranged in the valve chamber 6 and an opened passage from the inlet 3 to the first outlet 4 in a sectional view. The second outlet 5 is closed.

The major difference to the device 1-1 according to FIGS. 1A to 1C is the design of the fluid connection of the pressure chambers 14a, 14b by means of the connection channel 15-2 instead of the connection channels 15-1 according to the device 1-1. The otherwise identical components of the devices 1-1, 1-2 are provided with the same reference numerals. With regard to an explanation of the components, reference is made to the description for FIGS. 1A to 1C.

The connection channel 15-2 is designed within the valve element 7, in particular respectively between the coupling element 7c and the sections 7a, 7b, for example as a flattening in the region of the outer winding of the coupling element 7c, respectively in connection with the opening oriented in the longitudinal direction, in particular the through opening, extending between the pressure chambers 14a, 14b.

The sections 7a, 7b can be designed with a specific curved contour at the end faces which are respectively oriented towards the coupling element 7c, which enables an expansion of the refrigerant, respectively in connection with the first sealing element 12-1a, 12-1b and a relative arrangement of the section 7a, 7b to the first sealing element 12-1a, 12-1b. The contours can be designed depending on the respective expansion requirements in order to guarantee the functionality of relaxing the refrigerant when flowing the refrigerant out of the housing 2 of the device 1-1, 1-2. The function of relaxing the refrigerant is set with the arrangement of the valve element 7 within the housing 2, in particular the relative arrangement of a section 7a, 7b with regard to the first sealing element 12-1a, 12-1b and therewith the flow cross section between the curved contour of the section 7a, 7b and the first sealing element 12-1a, 12-1b as a through opening. When moving the valve element 7 in the movement direction 11, the flow cross section for the refrigerant through the device 1-1, 1-2 can be expanded or reduced in order to control the expansion function.

LIST OF REFERENCE NUMERALS 1-1, 1-2 device
2 housing
3 first port, inlet
4 second port, first outlet
5 third port, second outlet
6 valve chamber
7 valve element
7a first section of the valve element 7
7b second section of the valve element 7
7c coupling element
8a first valve seat element
8b second valve seat element
9 drive element of the valve element 7
10 connection element of the drive element 9
11 movement direction of the valve element 7
12-1a, 12-1b first sealing element
12-2a, 12-2b second sealing element
13 flow direction
14a first pressure chamber
14b second pressure chamber
15-1, 15-2 connection channel of the pressure chambers 14a, 14b
x, y direction

The invention claimed is:

1. A device for regulating a throughflow and distributing a fluid in at least one fluid circuit, the device comprising a housing with a first port, a second port, and a third port for connecting to fluid lines which are connected to at least one inner volume of the housing designed as a valve chamber via a respective through opening, and at least one valve element arranged in the valve chamber with a drive element for moving the at least one valve element relative to the housing, wherein the at least one valve element is mounted such that it can be displaced in a linear manner in an axial direction along a longitudinal axis such that a passage for the fluid is opened between the first port designed as an inlet and the second port designed as a first outlet and/or the third port designed as a second outlet, and wherein the at least one valve element is designed in the form of a cylinder oriented in the axial direction, with a first section and a second section which are arranged in the axial direction in a manner spaced apart from one another and are connected to one another via a coupling element, wherein the device has at least a first pressure chamber and a second pressure chamber which are respectively designed as a region of the valve chamber at an end face of the at least one valve element oriented in the axial direction, wherein at least one of the first pressure chamber and the second pressure chamber is designed such that it is fluidly connected to the through opening of the first port of the housing and the first pressure chamber and the second pressure chamber are fluidly connected to one another, and wherein the first pressure chamber and the second pressure chamber are designed such that they are fluidly connected to the through opening of the first port of the housing via a respective connection channel formed inside a wall of the housing separately from the valve chamber.

2. The device according to claim 1, wherein the coupling element arranged between the first section and the second section has a smaller outer circumference than the first section and the second section of the at least one valve element.

3. The device according to claim 1, wherein the first section and the second section are designed with same forms and extensions.

4. The device according to claim 1, wherein the at least one valve element is arranged with the first section within a first valve seat element and with the second section within a second valve seat element.

5. The device according to claim 4, wherein the first section and the second section of the at least one valve element can be arranged in a sealing manner via a first sealing element and a second sealing element to the housing and to the first valve seat element and the second valve seat element such that the first outlet and the second outlet are open or closed depending on an arrangement of the first section relative to the first sealing element and depending on an arrangement of the second section relative to the second sealing element.

6. The device according to claim 1, wherein the first section and the second section of the at least one valve element are respectively designed in a form of a hollow cylinder with an opening oriented in a longitudinal direction, wherein a wall enclosing the opening has an inner winding and an outer winding which are arranged at least in a region of ends of the coupling element such that the coupling element is screwed into one of the first section and the second section of the at least one valve element with a respective end.

7. The device according to claim 1, wherein the through openings of the first port, the second port, and the third port are arranged in a common plane spanned by x and y directions in which the longitudinal axis of the device is oriented running in the x direction.

8. The device according to claim 7, wherein the first port is designed merging from a first side of the longitudinal axis into the valve chamber and the second port and the third port are designed merging from a second side of the longitudinal axis into the valve chamber, wherein the second side is arranged opposite the first side.

9. The device according to claim 1, wherein symmetry axes of the through openings of the first port, the second port, and the third port are oriented in parallel to one another.

10. The device according to claim 1, wherein flow cross sections of the through openings of the first port, the second port, and the third port of the housing have a circular form, wherein diameters of the flow cross sections of the through openings are respectively constant.

11. The device according to claim 10, wherein the through openings of the first port, the second port, and the third port have diameters of equal sizes.

12. The device according to claim 5, wherein the at least one valve element is designed on end faces of the first section and the second section respectively oriented towards the coupling element, with a curved contour such that the fluid can be relaxed depending on an arrangement of the first section and the second section of the at least one valve element relative to the first sealing element and the second sealing element when flowing between the curved contour and the first sealing element and the second sealing element.

13. The device according to claim 1, wherein the at least one valve element is connected to the drive element arranged outside the housing via a connection element.

14. The device according to claim 13, wherein the connection element is designed as a shaft.

15. The device according to claim 13, wherein the connection element is arranged such that it is tightly connected to the drive element at a first end and protruding through a side into the housing at a second end designed distally to the first end and tightly connected to the at least one valve element.

16. The device according to claim 13, wherein the drive element is designed as a servomotor.

17. Use of the device for regulating the throughflow and distributing the fluid according to claim 1 in a refrigerant circuit of a thermal system, in particular a thermal management system, of a motor vehicle.

18. A device for regulating a throughflow and distributing a fluid in at least one fluid circuit, the device comprising a housing with a first port, a second port, and a third port for connecting to fluid lines which are connected to at least one inner volume of the housing designed as a valve chamber via a respective through opening, and at least one valve element arranged in the valve chamber with a drive element for moving the at least one valve element relative to the housing, wherein the at least one valve element is mounted such that it can be displaced in a linear manner in an axial direction along a longitudinal axis such that a passage for the fluid is opened between the first port designed as an inlet and the second port designed as a first outlet and/or the third port designed as a second outlet, and wherein the at least one valve element is designed in the form of a cylinder oriented in the axial direction, with a first section and a second section which are arranged in the axial direction in a manner spaced apart from one another and are connected to one another via a coupling element, wherein the device has at least a first pressure chamber and a second pressure chamber which are respectively designed as a region of the valve chamber at an end face of the at least one valve element oriented in the axial direction, wherein at least one of the first pressure chamber and the second pressure chamber is designed such that it is fluidly connected to the through opening of the first port of the housing and the first pressure chamber and the second pressure chamber are fluidly connected to one another, wherein the first pressure chamber and the second pressure chamber are fluidly connected to one another via a connection channel, wherein the connection channel is designed within the at least one valve element, and wherein regions of the connection channel are respectively designed as openings within the first section and the second section and respectively between each of the first section and the second section and the coupling element.

* * * * *